United States Patent
Ito et al.

(10) Patent No.: US 6,576,312 B1
(45) Date of Patent: Jun. 10, 2003

(54) FUEL TRANSPORTING TUBE

(75) Inventors: Hiroaki Ito, Kasugai (JP); Shinji Iio, Inazawa (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/439,870

(22) Filed: Nov. 12, 1999

(30) Foreign Application Priority Data

Nov. 18, 1998 (JP) .......................................... 10-327752

(51) Int. Cl.[7] ................................................. F16L 11/04
(52) U.S. Cl. ..................... 428/36.91; 138/137; 138/138; 428/36.6; 428/216; 428/474.9; 428/475.8; 428/476.1; 428/480; 428/483
(58) Field of Search ................................ 138/137, 138; 428/36.91, 36.6, 216, 474.9, 475.8, 476.1, 480, 483

(56) References Cited

U.S. PATENT DOCUMENTS

| | | | |
|---|---|---|---|
| 4,340,519 A | * 7/1982 | Kotera et al. ............... 523/414 |
| 5,389,721 A | * 2/1995 | Aharoni ....................... 525/50 |
| 5,425,817 A | 6/1995 | Mügge et al. ............... 138/137 |
| 5,554,425 A | 9/1996 | Krause et al. ............ 428/36.91 |
| 6,089,278 A | * 7/2000 | Nishino et al. ............. 138/137 |
| 6,090,459 A | * 7/2000 | Jadamus et al. ............ 428/36.4 |

FOREIGN PATENT DOCUMENTS

| EP | 0 679 826 | 11/1995 |
|---|---|---|
| JP | 07 047614 | 2/1995 |
| WO | WO 98 29245 | 7/1998 |

* cited by examiner

Primary Examiner—Sandra M. Nolan
(74) Attorney, Agent, or Firm—Burr & Brown (57) ABSTRACT

A fuel transporting tube including an inner layer which contacts a fuel being transported and which is formed of a polybutylene naphthalate resin, an outer layer which is provided radially outwardly of the inner layer and which is formed of a polyamide resin or a polyolefin resin, and an intermediate layer which is provided between the inner layer and the outer layer and which is formed of a resin to adhere the inner and outer layers to each other.

17 Claims, 2 Drawing Sheets

FUEL TRANSPORTING TUBE

BACKGROUND OF THE INVENTION

1. Field of the Invention

The present invention relates to a fuel transporting tube and particularly to such a tube which has a laminated structure including a plurality of layers, which exhibits an excellent resistance to permeation of fuels, e.g., not only gasoline but also alcohol-blended gasoline, an excellent detergent resistance, and an excellent hydrolysis-deterioration resistance, and exhibits an excellent resistance to interlayer separation when being used in a high-temperature atmosphere, and which is particularly suitable for use in a fuel-transporting piping system of an automotive vehicle.

2. Related Art Statement

A fuel-transporting piping system of an automotive vehicle includes a feed tube, a return tube, an evaporator hose, a breather hose, a filler hose, an ORVR-tube, or the like. Conventionally, various sorts of metallic, rubber, or resinous tubes or hoses have been used in the piping system. Recently, resinous tubes are widely used in consideration of cost performance, in particular. Meanwhile, national regulations regarding fuel evaporative emission have been stricter and stricter in consideration of environmental problems. That is, it is strongly desired to minimize the amount of fuel that permeates through the tubes and transpires into the atmosphere.

In United States of America, alcohol-blended gasoline is commercially used as a fuel of automotive vehicles. Generally, the amount of alcohol-blended gasoline that permeates out through a resinous or rubber tube is much more than that of non-blended gasoline that does not contain alcohol. Thus, it is desired to develop a tube which has an excellent resistance to permeation of not only non-blended gasoline but also alcohol-blended gasoline.

Various proposals have been made in the above-indicated background. For example, Japanese Patent Document TOKU-KAI-HEI No. 4(1992)-224384 discloses a fuel transporting tube including, as its fuel barrier layer, an innermost layer which is formed of a polyester resin such as polyethylene terephthalate or polybutylene terephthalate, and U.S. Pat. No. 5,425,817 discloses a multi-layer plastic tube including an innermost layer and an outermost layer each of which is formed of a polyamide, and including, as a low-permeation layer, an intermediate layer which is formed of a linear-crystalline polyester such as polyethylene terephthalate or polybutylene terephthalate. In addition, Japanese Pat. Document TOKU-KAI-HEI No. 6(1994)-23930 discloses a multi-layer polymer hose or pipe including an innermost layer and an outermost layer each of which is formed of a polyamide, and including, as a low-permeation layer, an intermediate layer which is formed of a polyester resin such as polyethylene terephthalate, polybutylene terephthalate, or polyethylene naphthalate, and European Patent Application No. 0686797 A1 discloses a multi-layer plastic tube including, as a low-permeation layer, an innermost layer which is formed of a thermoplastic polyester such as polyethylene terephthalate or polybutylene terephthalate.

However, even the above-indicated multi-layer or laminated tubes that are claimed to be resistant to permeation of alcohol-blended gasoline, do not satisfactorily meet the currently desired, very strict requirement regarding the resistance to permeation of alcohol-blended gasoline, even if those resins disclosed in the prior documents may be selected anyway.

Out of the above-indicated tubes, ones whose innermost layer is formed of polyethylene terephthalate or polybutylene terephthalate are deteriorated, during a long period of use, because of an amine detergent that is usually added to a fuel for the purpose of removing stains of an intake valve. That is, those tubes do not exhibit a sufficiently high detergent resistance. In addition, tubes whose innermost layer is formed of one of the resins disclosed in the prior documents do not exhibit a sufficiently high resistance to hydrolysis of innermost layer. More specifically described, the innermost layer may be hydrolyzed because of water contained in the fuel, or moisture present in the atmosphere. Therefore, those tubes do not exhibit a sufficiently high reliability when being used as fuel transporting tubes for a long period in a high-temperature atmosphere.

Moreover, in the case where the low-permeation layers are used as not the respective innermost layers of tubes but the respective intermediate layers thereof, the intermediate layers may peel or separate from respective layers- provided radially inwardly of the intermediate layers, in particular when being used in a high-temperature atmosphere. Thus, the tubes including, as their intermediate layers, the low-permeation layers do not exhibit a sufficiently high reliability.

By the way, Japanese Patent Document TOKU-KAI-HEI No. 7(1995)-96564 discloses a fuel transporting tube which is claimed to be able to be used as a low-permeation or anti-permeation layer against alcohol-blended gasoline, and which includes, as an anti-permeation layer, an intermediate layer formed of a polyalkylene naphthalate resin, such as polybutylene naphthalate, that exhibits a higher permeation resistance than a polyester resin, such as polybutylene terephthalate, and additionally includes an innermost layer which is formed of a fluororesin or a polyamide. Since the fuel transporting tube has a laminated structure including the above-indicated resinous innermost layer, the anti-permeation intermediate layer may separate from the innermost layer located inside the intermediate layer, because of the fuel which permeates out through the innermost layer, though an adhesive layer is provided between the intermediate layer and the innermost layer. Thus, the tube does not exhibit a sufficiently high reliability.

In particular, since the innermost layer formed of fluororesin or polyamide resin is provided inside the low-permeation or anti-permeation intermediate layer, the tube has an increased overall wall thickness, which leads to limiting the thickness of the intermediate layer, thereby limiting the anti-permeation function of the same. In addition, in the case where the innermost layer is formed of polyamide resin, the innermost layer may be less resistant to sour gasoline than the polybutylene naphthalate resin. Meanwhile, in the case where the innermost layer is formed of fluororesin, the innermost layer may exhibit a low detergent resistance, and may exhibit a low sealing characteristic because the fluororesin has a low friction coefficient and is highly slidable relative to a coupling or a metallic member being inserted into an open end of the tube.

SUMMARY OF THE INVENTION

It is therefore an object of the present invention to provide a fuel transporting tube which exhibits an excellent resistance to permeation of not only gasoline but also alcohol-blended gasoline, an excellent detergent resistance, and an excellent hydrolysis resistance, and exhibit an excellent resistance to interlayer separation when being used in a high-temperature atmosphere.

The present invention provides a fuel transporting tube which has one or more of the technical features that are described below in respective paragraphs given parenthesized sequential numbers (1) to (17). Any feature which includes another feature shall do so by referring, at the beginning, to the parenthesized sequential number given to that feature. Thus, two or more of the following features may be combined, if appropriate. Each feature may be accompanied by a supplemental explanation, as needed. However, the following features and the appropriate combinations thereof are just examples to which the present invention is by no means limited.

(1) According to a first feature of the present invention, there is provided a fuel transporting tube comprising an inner layer which contacts a fuel being transported and which is formed of a polybutylene naphthalate resin; an outer layer which is provided radially outwardly of the inner layer and which is formed of a polyamide resin or a polyolefin resin; and an intermediate layer which is provided between the inner layer and the outer layer and which is formed of a resin to adhere the inner and outer layers to each other.

In the present fuel transporting tube, the inner layer that contacts the fuel being transported by the tube is formed of the polybutylene naphthalate resin. Therefore, the present tube exhibits an excellent resistance to permeation of fuels, e.g., not only common gasoline but also alcohol-blended gasoline. Even in the case where an amine detergent is added to the fuel, the present tube exhibits an excellent resistance to deterioration due to the detergent. Moreover, the present tube exhibits an excellent resistance to deterioration due to hydrolysis. Thus, the present tube exhibits a high reliability in a long-time use. Furthermore, the present tube exhibits an excellent resistance to interlayer separation when being used in a high-temperature atmosphere. The present tube does not need any additional layers inside the inner layer formed of the polybutylene naphthalate resin. Therefore, the thickness of the inner layer formed of the polybutylene naphthalate resin can be increased by the thickness of the unnecessary layer or layers, so as to improve the resistance to permeation of alcohol-blended gasoline. The polybutylene naphthalate resin exhibits a higher resistance to sour gasoline than polyamide resin, and is free of a problem with fluororesin that an innermost layer formed of the fluororesin exhibits a low sealing characteristic because a coupling or a metallic member may slide relative to the tube when being inserted in an open end of the tube.

(2) According to a second feature of the present invention that includes the first feature (1), the inner layer comprises a conductive layer which is formed of a composition comprising the polybutylene naphthalate resin and an electrically conductive material. Since the inner layer of the present tube that contacts the fuel being transported is electrically conductive, the present tube is advantageously used as a tube, e.g., a filler tube, a feed tube, or a return tube, that should be prevented from producing sparks due to discharging of electric charge.

(3) According to a third feature of the present invention that includes the first feature (1), the inner layer comprises a conductive inside layer which contacts the fuel and which is formed of a composition comprising the polybutylene naphthalate resin and an electrically conductive material; and a non-conductive outside layer which is provided radially outwardly of the inside layer and which is formed of the polybutylene naphthalate resin and does not include any electrically conductive materials. The present tube enjoys the same advantage as that of the tube according to the second feature (2).

(4) According to a fourth feature of the present invention that includes any one of the first to third features (1) to (3), the intermediate layer is formed of at least one resin selected from the group consisting of a thermoplastic polyether urethane, a thermoplastic polyester urethane, a thermoplastic polyether amide elastomer, a thermoplastic polyester amide elastomer, a thermoplastic polyester elastomer, a mixture of a thermoplastic polyester elastomer and a polyamide, a mixture of a polyester and a polyamide, a maleic anhydride-modified polyolefin, an acrylic acid-modified polyolefin, an epoxy-modified polyolefin, a maleic anhydride-olefin copolymer, and an alkylacrylate-olefin copolymer. In the present tube, the intermediate layer advantageously connects the inner and outer layers to each other and thereby unifies the two layers.

(5) According to a fifth feature of the present invention that includes any one of the first to fourth features (1) to (4), the polybutylene naphthalate resin comprises a block-copolymer which includes, as a hard segment thereof, a polybutylene naphthalate unit, and includes, as a soft segment thereof, a polyether unit or a polyester unit. Since the inner layer of the present tube is formed of the block-copolymer as the polybutylene naphthalate resin, the softness or flexibility of the inner layer is improved. In addition, the melting point of the polybutylene naphthalate resin is lowered down to a temperature near a temperature around which the outer layer is formed of the polyamide or polyolefin resin. Thus, the inner and outer layers can be more advantageously formed by concurrent or simultaneous extrusion.

(6) According to a sixth feature of the present invention that includes any one of the first to fifth features (1) to (5), at least a portion of the tube has a corrugated shape which includes at least one annular ridge and at least one annular groove which are alternate with each other and each of which extends parallel to a plane perpendicular to a lengthwise direction of the tube. The present tube as a whole can enjoy an improved flexibility, even if the inner layer formed of the polybutylene terephthalate resin may have a great thickness. Thus, the present tube enjoys not only an improved permeation resistance but also an improved ease of being handled and/or being assembled with other members.

(7) According to a seventh feature of the present invention that includes any one of the first to fourth and sixth features (1) to (4) and (6), the polybutylene naphthalate resin comprises a condensation polymerization product of a naphthalenedicarboxylic acid or its derivative capable of producing an ester, and tetramethylene glycol.

(8) According to an eighth feature of the present invention that includes the seventh feature (7), the naphthalenedicarboxylic acid is selected from the group consisting of
1,4-naphthalenedicarboxylic acid,
1,5-naphthalenedicarboxylic acid,
2,6-naphthalenedicarboxylic acid, and
2,7-naphthalenedicarboxylic acid.

(9) According to a ninth feature of the present invention that includes the fifth or sixth feature (5) or (6), the polyether unit comprises a segment consisting of a naphthalenedicarboxylic acid or terephthalic acid and $HO(CH_2CH_2O)_nH$ or $HO(CH_2CH_2CH_2CH_2O)_nH$ (n is an integer).

(10) According to a tenth feature of the present invention that includes any one of the fifth, sixth and ninth features (5), (6) and (9), the polyester unit comprises a unit selected from the group consisting of polycaprolactone, polyenantholactone, and polycaprylolactone.

(11) According to an eleventh feature of the present invention that includes any one of the fifth, sixth, ninth and tenth features (5), (6), (9) and (10), the block-copolymer includes not more than 40 parts by weight of the soft segment and not less than 60 parts by weight of the hard segment.

(12) According to a twelfth feature of the present invention that includes any one of the second to eleventh features (2) to (11), the composition comprises 3 to 30 parts by weight of the electrically conductive material per 100 parts by weight of the polybutylene naphthalate resin.

(13) According to a thirteenth feature of the present invention that includes any one of the first to twelfth features (1) to (12), the polyamide resin is selected from the group consisting of nylon 6, nylon 66, nylon 11, nylon 12, nylon 610, and nylon 612.

(14) According to a fourteenth feature of the present invention that includes any one of the first to thirteenth features (1) to (13), the polyolefin resin is selected from the group consisting of a homopolymer and a copolymer of an olefin monomer selected from the group consisting of ethylene, propylene, butene, hexene, and octene, and a thermoplastic elastomer including, as a main component thereof, the homopolymer or the copolymer.

(15) According to a fifteenth feature of the present invention that includes any one of the first to fourteenth features (1) to (14), an outer diameter of the tube falls within a range of 8 to 50 mm, and a sum of respective thicknesses of the inner layer, the intermediate layer, and the outer layer falls within a range of 0.8 to 2.0 mm.

(16) According to a sixteenth feature of the present invention that includes any one of the first to fifteenth features (1) to (15), a thickness of the inner layer falls within a range of 0.04 to 1.0 mm, a thickness of the intermediate layer falls within a range of 0.02 to 0.5 mm, and a thickness of the outer layer falls within a range of 0.4 to 1.40 mm.

(17) According to a seventeenth feature of the present invention that includes any one of the third to sixteenth features (3) to (16), a thickness of the inside layer of the inner layer falls within a range of 5 to 50% of a sum of respective thicknesses of the inside layer and the outside layer of the inner layer.

BRIEF DESCRIPTION OF THE DRAWINGS

The above and optional objects, features and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Figure 1:
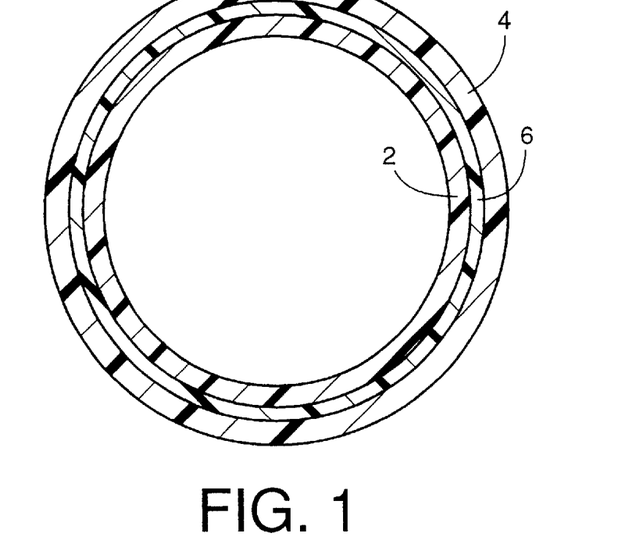
FIG. 1 is a transverse cross section view of a fuel transporting tube as a first embodiment of the present invention.
Figure 2:
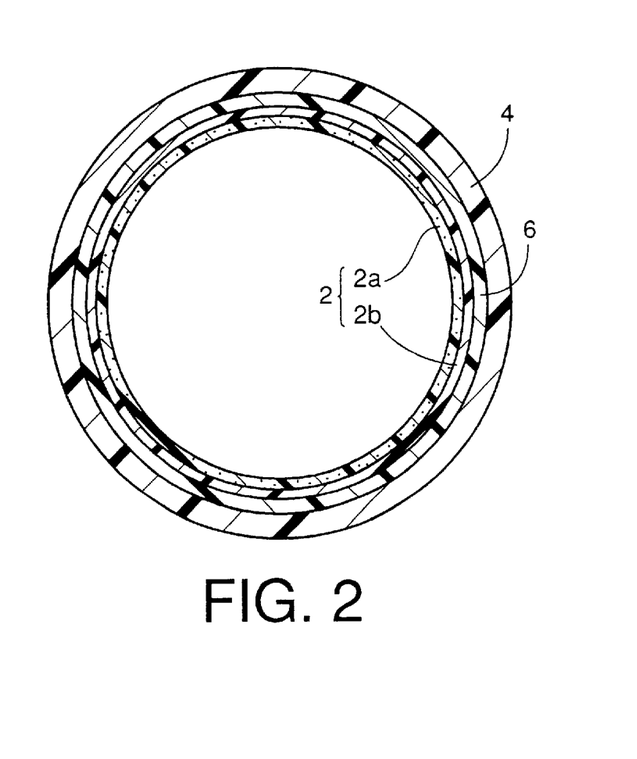
FIG. 2 is a transverse cross section view of another fuel transporting tube as a second embodiment of the present invention.

FIGS. 1 and 2 show a fuel transporting tube according to the present invention. The tube includes an inner layer 2 which contacts a fuel being transported by the tube. The inner tube 2 is formed of a polybutylene naphthalate resin. The polybutylene naphthalate resin is a condensation polymerization product of a naphthalenedicarboxylic acid or its derivative capable of producing an ester, and tetramethylene glycol. The naphthalenedicarboxylic acid is preferably selected from 1,4-naphthalenedicarboxylic acid,
1,5-naphthalenedicarboxylic acid,
2,6-naphthalenedicarboxylic acid, and
2,7-naphthalenedicarboxylic acid.

Out of those acids, the 2,6-naphthalenedicarboxylic acid is most preferably used.

The polybutylene naphthalate resin used to form the inner layer 2 may be a block-copolymer resin which includes, as a hard segment thereof, a polybutylene naphthalate unit, and includes, as a soft segment thereof, a polyether unit or a polyester unit. The block-copolymer resin contributes to increasing the softness or flexibility of the inner layer 2, and lowering the melting point of the material used to form the inner layer 2, down to a temperature near a temperature around which an outer layer 4 is formed of a polyamide resin or a polyolefin resin as described later, so that the inner and outer layers 2, 4 can be easily co-extruded (i.e., simultaneously extruded). The polyether unit may be a segment consisting of a naphthalenedicarboxylic acid or terephthalic acid and $HO(CH_2CH_2O)_nH$ or $HO(CH_2CH_2CH_2CH_2O)_nH$ (n is an integer), and the polyester unit may be a unit selected from polycaprolactone, polyenantholactone, and polycaprylolactone. Generally, the block-copolymer resin includes not more than 40 parts or % by weight of the soft segment, and not less than 60 parts or % by weight of the hard segment. If the block-copolymer resin includes more than 40 parts by weight of the soft segment, the inner layer 2 formed of the block-copolymer resin cannot exhibit a sufficiently high permeation resistance.

In the case where the present fuel transporting tube is used as a specific tube, e.g., a filler tube, a feed tube, or a return tube, that should be prevented from producing sparks due to discharging of electric charge, it is preferred that the inner layer 2 is formed of a composition comprising the polybutylene naphthalate resin and an electrically conductive material. The conductive material may be selected from known materials. Preferably, conductive carbon black is used as the conductive material, and the composition includes 3 to 30 parts by weight of the carbon black per 100 parts by weight of the polybutylene naphthalate resin, so that the exposed surface of the inner layer 2 has an electric resistance of not more than $10^8$ Ω. In order that the inner layer 2 may have an effective electric conductivity due to the inclusion of the conductive carbon black, it is desirable as indicated above that the composition includes not less than 3 parts by weight of the carbon black per 100 parts by weight of the polybutylene naphthalate resin. Meanwhile, in order that the inner layer 2 may maintain an effective permeation resistance and an effective mechanical strength, it is desirable that the composition includes not more than 30 parts by weight of the carbon black per 100 parts by weight of the resin. The conductive carbon black may be Ketjenblack EC or Ketjenblack EC 600 JD available from Akzo Inc., the Netherlands.

In the case where the inner layer 2 is formed of the composition including the polybutylene naphthalate resin and the electrically conductive material, the inclusion of the conductive material leads to lowering more or less the permeation resistance of the inner layer 2. Hence, in another fuel transporting tube shown in FIG. 2, an inner layer 2 of the tube includes an inside layer 2a and an outside layer 2b, such that the inside layer 2a is formed of the composition including the polybutylene naphthalate resin and the electrically conductive material, and the outside layer 2b is formed of the polybutylene naphthalate resin and does not include any electrically conductive materials. In this case, the lowering of the permeation resistance of the inside layer 2a is compensated by the high permeation resistance of the outside layer 2b, and the inner layer 2 as a whole exhibits an effective permeation resistance.

The tube shown in FIG. 1 or the tube shown in FIG. 2 additionally includes an outer layer 4 which is provided radially outwardly of the inner layer 2. The outer layer 4 is formed of a polyamide resin or a polyolefin resin. Thus, the thickness of the inner layer 2 can be minimized, and the strength of the tube as a whole can be maintained. In addition, the outer layer 4 formed of the polyamide resin or the polyolefin resin contributes to giving flexibility or softness to the tube, thereby improving the ease of being handled or being assembled with other elements. The polyamide resin is preferably selected from nylon 6, nylon 66, nylon 11, nylon 12, nylon 610, and nylon 612. The nylon 11 or the nylon 12 is most preferably used. The polyamide resin may be mixed with one or more of a plasticizer, an elastomer, a nylon monomer, and the like, for improving the softness thereof. The polyolefin resin is preferably selected from a homopolymer and a copolymer of an olefin monomer selected from ethylene, propylene, butene, hexene, and octene, and a thermoplastic elastomer including, as a main component thereof, the homopolymer or the copolymer.

The tube shown in FIG. 1 or the tube shown in FIG. 2 further includes an intermediate layer 6 between the inner and outer layers 2, 4. The intermediate layer 6 adheres or connects the inner and outer layers 2, 4 to each other so as to provide an integral, laminated body. The intermediate layer 6 is formed of a material which is selected depending upon respective sorts of the resins used to form the inner and outer layers 2, 4. Preferably, the intermediate layer is formed of a resin selected from a thermoplastic polyether urethane, a thermoplastic polyester urethane, a thermoplastic polyether amide elastomer, a thermoplastic polyester amide elastomer, a thermoplastic polyester elastomer, a mixture of a thermoplastic polyester elastomer and a polyamide, a mixture of a polyester and a polyamide, a maleic anhydride-modified polyolefin, an acrylic acid-modified polyolefin, an epoxy-modified polyolefin, a maleic anhydride-olefin copolymer, and an alkylacrylate-olefin copolymer, or a mixture of two or more resins out of those resins.

Various dimensions of the fuel transporting tube shown in FIG. 1 or FIG. 2 are by no means limited. However, generally, the tube has an outer diameter falling within the range of 8 to 50 mm, and the sum of respective thicknesses of the inner layer 2, the intermediate layer 6, and the outer layer 4 falls within the range of 0.8 to 2.0 mm. The respective thicknesses of the inner layer 2, the intermediate layer 6, and the outer layer 4 are so determined that the three layers 2, 4, 6 can function as required. Generally, the thickness of the inner layer falls within the range of 0.04 to 1.0 mm, the thickness of the intermediate layer falls within the range of 0.02 to 0.5 mm, and the thickness of the outer layer falls within the range of 0.4 to 1.40 mm. In the tube shown in FIG. 2, the thickness of the inside layer 2a of the inner layer 2 falls within the range of 5 to 50% of the sum of respective thicknesses of the inside layer 2a and the outside layer 2b.

The fuel transporting tube shown in FIG. 1 or FIG. 2 may be provided, as needed, with a protector tube, such as a solid tube or a sponge tube, outside the outer layer 4, so that the tube is protected by the protector tube against flame or splashed pebbles. The solid tube or the sponge tube may be formed of EPDM, EPM, or the like. The protector tube may be formed on the outer surface of the outer layer 4, such that the protector tube is integrally connected to the outer layer 4. Alternatively, the protector tube may be formed as a separate member, and is externally fitted on the outer surface of the outer layer 4.

The fuel transporting tube shown in FIG. 1 or FIG. 2 may be manufactured in a conventional method in which the inner layer 2, the intermediate layer 6, and the outer layer 4 are sequentially formed in the order of description to provide a tube having a laminated structure. Alternatively, the three layers 2, 6, 4 may be simultaneously extruded (i.e., co-extruded) to provide a tube having an integral, laminated structure. Preferably, in order to improve the degree of adhesiveness among the three layers 2, 4, 6, the three layers 2, 4, 6 are simultaneously extruded to provide a target tube having an integral, laminated structure.

Figure 3:
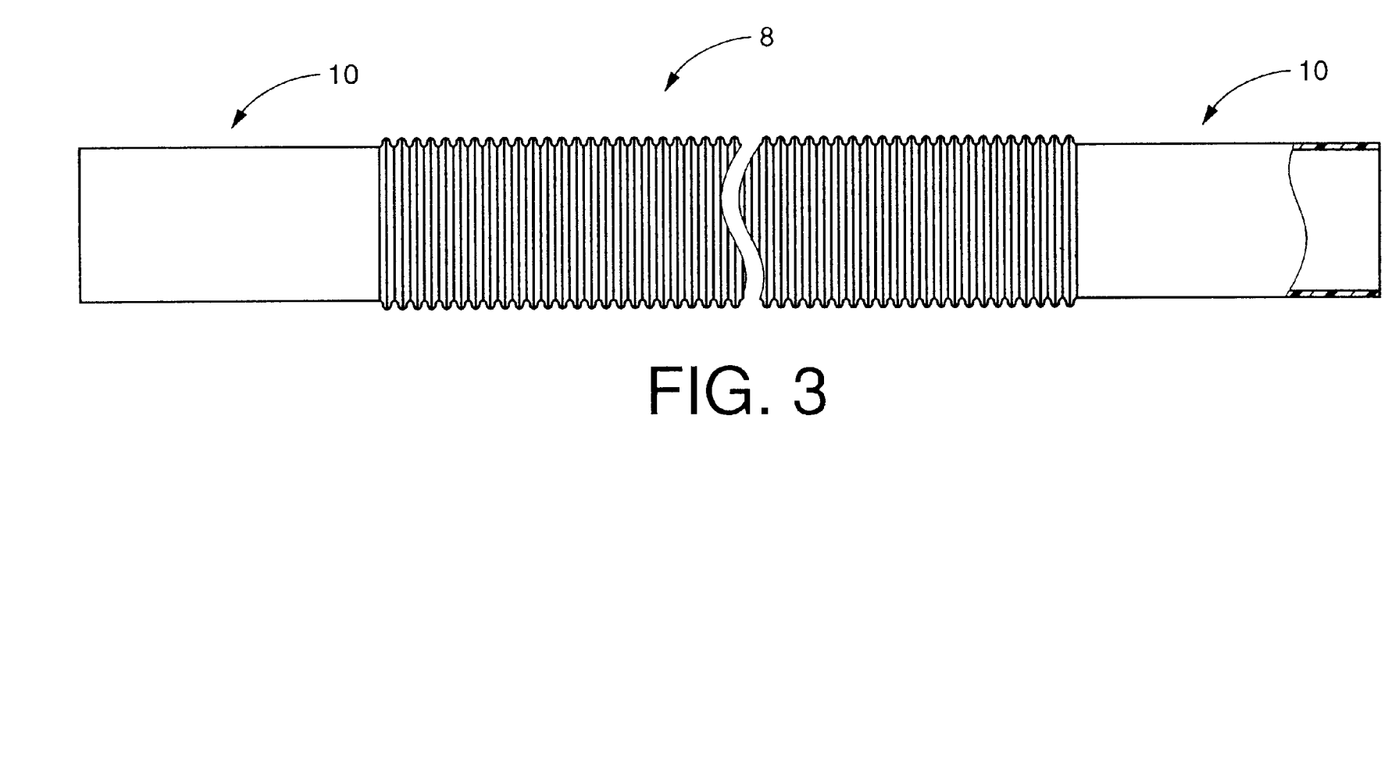
FIG. 3 is a plan view of a fuel transporting bellows tube as a third embodiment of the present invention.

While the fuel transporting tube shown in FIG. 1 or FIG. 2 is a smooth tube whose outer circumferential surface is smooth, a fuel transporting tube according to the present invention may be a bellows tube at least a portion of which has a corrugated shape including one or more annular ridges and one or more annular grooves which are alternate with each other and each of which extends parallel to a plane perpendicular to a lengthwise or axial direction of the tube. FIG. 3 shows a fuel transporting bellows tube including an axially intermediate bellows portion 8 and two axially end smooth portions 10 located on both sides of the bellows portion 8. Since the bellows portion 8 has an improved flexibility, the bellows tube enjoys not only an improved permeation resistance but also an improved ease of being handled or being assembled with other elements.

In the case where the inner layer 2, the intermediate layer 6, and the outer layer 4 are simultaneously extruded, first, respective resin materials used to form the three layers 2, 4, 6 are put in respective hoppers of three extruders (or four extruders in the case where the inner layer 2 consists of the inside layer 2a and the outside layer 2b). Subsequently, the three layers 2, 4, 6 (or the four layers 2a, 2b, 4, 6) are simultaneously extruded from a common die at a temperature of 160 to 280° C., so as to provide a tube having an integral, laminated structure. In the case where a smooth tube is produced, the extruded tube is passed through a cooling device via a sizing die and then is taken up by a take-up machine. Thus, a target tube is obtained. Meanwhile, in the case where a bellows tube as shown in FIG. 3 is produced, the extruded tube is passed through a corrugater machine in which a forming die having a corrugated shape and a forming die having a smooth shape are arranged, and thus a target tube is obtained. In the latter case, if only the forming die having the smooth shape is provided in the corrugater machine, a smooth tube can be obtained.

Hereinafter, some examples of a fuel transporting tube according to the present invention will be described in more detail to elucidate the nature of the present invention. However, it is to be understood that the present invention is by no means limited to the details of those examples, and that the present invention may be embodied with other changes, modifications, and improvements than those examples and the above-described embodiments that may occur to one skilled in the art without departing from the scope and spirit of the invention.

Various sorts of invention tubes are obtained as follows: Each invention tube is a bellows tube, as shown in FIG. 3, which includes an intermediate bellows portion 8 having an outer diameter of 36 mm and an axial length of 300 mm, and two axially end smooth portions 10 each having an outer diameter of 32 mm and an axial length of 100 mm. Each invention tube has a laminated structure as shown in FIG. 1 or FIG. 2, and has an overall wall thickness of 1 mm and an overall axial length of 500 mm. Each invention tube is formed of resin materials indicated in TABLE 1 to TABLE 7, and respective layers 2 (2a, 2b), 4, 6 of each invention tube are formed to have respective thicknesses indicated in the tables. The invention tubes are produced in the conventional simultaneous-extrusion method.

The polybutylene naphthalate resin (hereinafter referred to as "PBN") used to produce the invention tubes is obtained by using, as the naphthalenedicarboxylic acid, 2,6-naphthalenedicarboxylic acid. A first conductive composition ("1st CC") including PBN and an electrically conductive material is obtained by mixing 100 parts by weight of PBN and 10 parts, by weight of Ketjenblack EC 600 JD and uniformly kneading, using a two-axis kneading machine, the thus obtained mixture. The PBN-polyether block-copolymer used is a first block-copolymer including, as its hard segments, 80% by weight of PBN units, and including, as its soft segments, 20% by weight of polytetramethylene glycol units. A second conductive composition ("2nd CC") including a PBN-polyether block-copolymer and an electrically conductive material is obtained by mixing 100 parts by weight of the above-indicated first block-copolymer and 10 parts by weight of Ketjenblack EC 600 JD and uniformly kneading, using the two-axis kneading machine, the thus obtained mixture.

The PBN-polyester block-copolymer used is a second block-copolymer including, as its hard segments, 80% by weight of PBN units, and including, as-its soft segments, 20% by weight of polycaprolactone units. A third conductive composition ("3rd CC") including a PBN-polyester block-copolymer and an electrically conductive material is obtained by mixing 100 parts by weight of the above-indicated second block-copolymer and 10 parts by weight of Ketjenblack EC 600 JD and uniformly kneading, using the two-axis kneading machine, the thus obtained mixture.

In the tables, "PE" is an abbreviation of polyethylene and "PP" is an abbreviation of polypropylene.

Each of the thus obtained invention tubes is tested and evaluated regarding its fuel-permeation resistance, detergent resistance, hydrolysis resistance, and interlayer-separation resistance, according to the below-explained methods, and the obtained results are shown in the same tables.

FUEL-PERMEATION RESISTANCE

A standard gasoline or fuel, Fuel C ("FC"), or an alcohol-blended gasoline or fuel ("M15") including 85% by volume of FC and 15% by volume of methanol, is put in each test tube and is kept in a thermostat held at 40° C. Each time 24 hours elapse, each tube is taken out of the thermostat, and a decreased weight of each tube is measured. This procedure is repeated twenty times, and the largest one of the measured decreased weights is chosen to calculate a fuel permeation amount per meter (of tube) per day (mg/m/day).

DETERGENT RESISTANCE

Dodecamethylenediamine as a sort of amine is used as an amine detergent. A standard fuel, Fuel C, including dodecamethylenediamine in an amount of 0.05 mol/L is put in each test tube and is kept in a thermostat held at 80° C. 200 and 400 hours after, each tube is taken out of the thermostat, and the fuel is removed from the tube. Then, each tube is folded by 180 degrees, and whether any cracks are present in the inner surface of the tube is checked. A tube free of cracks 400 hours after is evaluated "A"; a tube with cracks 400 hours after is evaluated "B"; and a tube with cracks 200 hours after is evaluated "C".

HYDROLYSIS RESISTANCE

A solution including 15% by volume of methanol and 85% by volume of water is put in each test tube and is kept in a thermostat held at 80° C. 1500 and 3000 hours after, each tube is taken out of the thermostat, and the solution is removed from the tube. Then, each tube is folded by 180 degrees, the folded portion of the tube is cut, and whether any cracks are present in the cut surface of the tube is checked. A tube free of cracks 3000 hours after is evaluated "A"; a tube with cracks 3000 hours after is evaluated "B"; and a tube with cracks 1500 hours after is evaluated "C".

INTERLAYER-SEPARATION RESISTANCE

The alcohol-blended fuel, i.e., M15 is put in each test tube and is kept in a thermostat held at 60° C., for 168 hours. Then, the fuel is removed from each tube and is kept in the thermostat held at 80° C. for 72 hours. This procedure is repeated three times, and a peeling test is carried out according to JIS-K-6256 ("JIS" is Japanese Industrial Standard). More specifically described, a 25 mm long ring-like axial portion of each tube is cut off, and the thus obtained axial portion is cut and opened along a longitudinal axis line thereof. Thus, a test specimen is obtained. Then, in the case of a test tube including, as its inner layer, an anti-permeation layer, the inner layer and an intermediate layer of the tube, appearing in the cut surface of the same, are fixed to two grippers of a tensile testing machine, respectively. Meanwhile, in the case of a test tube including, as its intermediate layer, an anti-permeation layer, the layers inside the anti-permeation intermediate layer, and the outside layers including the anti-permeation intermediate layer, all appearing in the cut surface of the tube, are fixed to the two grippers of the tensile testing machine, respectively. Then, the two grippers are drawn in opposite directions at a speed of 25 mm/min. Thus, a separation-resistant strength (or adhesive strength) is measured. A tube having a separation-resistant ("SR") strength of not less than 2 N/mm is evaluated "A"; a tube which has an SR strength of not less than 1 N/mm and not more than 2 N/mm is evaluated "B"; and a tube which has an SR strength of not more than 1 N/mm is evaluated "C".

TABLE 1

|  |  | INVENTION TUBE 1 | INVENTION TUBE 2 | INVENTION TUBE 3 | INVENTION TUBE 4 | INVENTION TUBE 5 |
| --- | --- | --- | --- | --- | --- | --- |
| INNER LAYER | MATERIAL | PBN | PBN | PBN | PBN | 1ST CC*5 |
|  | THICKNESS | 0.3 mm | 0.3 mm | 0.3 mm | 0.3 mm | 0.3 mm |
| INTERMEDIATE LAYER | MATERIAL | TPU*1 | TPU*1 | MAMPE*2 | MAMPE*2 | TPU |
|  | THICKNESS | 0.1 mm | 0.1 mm | 0.1 mm | 0.1 mm | 0.1 mm |
| OUTER LAYER | MATERIAL | NYLON 12 | NYLON 11 | HDPE*3 | TPE(PP)*4 | NYLON 12 |
|  | THICKNESS | 0.6 mm | 0.6 mm | 0.6 mm | 0.6 mm | 0.6 mm |
| FUEL-PERMEATION RESISTANCE | FC PERMEATION AMOUNT | 51 mg/m/day | 50 | 53 | 53 | 80 mg/m/day |
|  | M15 PERMEATION AMOUNT | 75 mg/m/day | 73 | 79 | 81 | 110 mg/m/day |
| DETERGENT RESISTANCE |  | A | A | A | A | A |
| HYDROLYSIS RESISTANCE |  | A | A | A | A | A |
| INTERLAYER-SEPARATION RESISTANCE |  | A | A | A | A | A |

*1 - TPU: thermoplastic polyester urethane
*2 - MAMPE: maleic anhydride-modified PE
*3 - HDPE: high-density PE
*4 - TPE(PP): thermoplastic elastomer including PP as its component
*5 - 1ST CC: first conductive composition including PBN

TABLE 2

|  |  | INVENTION TUBE 6 | INVENTION TUBE 7 | INVENTION TUBE B | INVENTION TUBE 9 | INVENTION TUBE 10 |
| --- | --- | --- | --- | --- | --- | --- |
| INNER LAYER | INSIDE LAYER / MATERIAL | 1ST CC | 1ST CC | 1ST CC | 1ST CC | 1ST CC |
|  | INSIDE LAYER / THICKNESS | 0.3 mm | 0.3 mm | 0.1 mm | 0.1 mm | 0.1 mm |
|  | OUTSIDE LAYER / MATERIAL | — | — | PBN | PBN | PBN |
|  | OUTSIDE LAYER / THICKNESS | — | — | 0.2 mm | 0.2 mm | 0.2 mm |
| INTERMEDIATE LAYER | MATERIAL | TPU | MAMPE | TPU | TPU | MAMPE |
|  | THICKNESS | 0.1 mm | 0.1 mm | 0.1 mm | 0.1 mm | 0.1 mm |
| OUTER LAYER | MATERIAL | NYLON 11 | TPE(PP) | NYLON 12 | NYLON 11 | TPE(PP) |
|  | THICKNESS | 0.6 mm | 0.6 mm | 0.6 mm | 0.6 mm | 0.6 mm |
| FUEL-PERMEATION RESISTANCE | FC PERMEATION AMOUNT | 77 mg/m/day | 86 | 63 | 62 | 65 mg/m/day |
|  | M15 PERMEATION AMOUNT | 102 mg/m/day | 119 | 94 | 90 | 102 mg/m/day |
| DETERGENT RESISTANCE |  | A | A | A | A | A |
| HYDROLYSIS RESISTANCE |  | A | A | A | A | A |
| INTERLAYER-SEPARATION RESISTANCE |  | A | A | A | A | A |

TABLE 3

|  |  | INVENTION TUBE 11 | INVENTION TUBE 12 | INVENTION TUBE 13 | INVENTION TUBE 14 |
|---|---|---|---|---|---|
| INNER LAYER | MATERIAL | PBN-POLYETHER BLOCK-COPOLYMER | | | |
|  | THICKNESS | 0.5 mm | | | |
| INTERMEDIATE LAYER | MATERIAL | TPE(ETA) *6 | | AAMPE *7 | |
|  | THICKNESS | 0.1 mm | | | |
| OUTER LAYER | MATERIAL | NYLON 12 | NYLON 11 | HDPE | TPE (PP) |
|  | THICKNESS | 0.4 mm | | | |
| FUEL-PERMEATION RESISTANCE | FC PERMEATION AMOUNT | 121 mg/m/day | 115 | 136 | 145 |
|  | M15 PERMEATION AMOUNT | 193 mg/m/day | 185 | 213 | 236 |
| DETERGENT RESISTANCE |  | A | A | A | A |
| HYDROLYSIS RESISTANCE |  | A | A | A | A |
| INTERLAYER-SEPARATION RESISTANCE |  | A | A | A | A |

*6 - TPE(ETA): thermoplastic polyether amide elastomer
*7 - AAMPE: acrylic acid-modified PE

TABLE 4

|  |  | INVENTION TUBE 15 | INVENTION TUBE 16 | INVENTION TUBE 17 | INVENTION TUBE 18 |
|---|---|---|---|---|---|
| INNER LAYER | MATERIAL | PBN-POLYESTER BLOCK-COPOLYMER | | | |
|  | THICKNESS | 0.5 mm | | | |
| INTERMEDIATE LAYER | MATERIAL | TPE(ESA) *8 | | AAMPE | |
|  | THICKNESS | 0.1 mm | | | |
| OUTER LAYER | MATERIAL | NYLON 12 | NYLON 11 | HDPE | TPE (PP) |
|  | THICKNESS | 0.4 mm | | | |
| FUEL-PERMEATION RESISTANCE | FC PERMEATION AMOUNT | 105 mg/m/day | 100 | 112 | 124 |
|  | M15 PERMEATION AMOUNT | 152 mg/m/day | 148 | 165 | 177 |
| DETERGENT RESISTANCE |  | A | A | A | A |
| HYDROLYSIS RESISTANCE |  | A | A | A | A |
| INTERLAYER-SEPARATION RESISTANCE |  | A | A | A | A |

*8 - TPE(ESA): thermoplastic polyester amide elastomer

TABLE 5

|  |  | INVENTION TUBE 19 | INVENTION TUBE 20 | INVENTION TUBE 21 |
|---|---|---|---|---|
| INNER LAYER | INSIDE LAYER / MATERIAL | 2ND CC*9 | | |
|  | INSIDE LAYER / THICKNESS | 0.1 mm | | |
|  | OUTSIDE LAYER / MATERIAL | PBN | | |
|  | OUTSIDE LAYER / THICKNESS | 0.2 mm | | |
| INTERMEDIATE LAYER | MATERIAL | TPU | | MAMPE |
|  | THICKNESS | 0.1 mm | | |
| OUTER LAYER | MATERIAL | NYLON 12 | NYLON 11 | TPE(PP) |
|  | THICKNESS | 0.6 mm | | |
| FUEL-PERMEATION RESISTANCE | FC PERMEATION AMOUNT | 82 mg/m/day | 81 | 86 |
|  | M15 PERMEATION AMOUNT | 104 mg/m/day | 100 | 113 |
| DETERGENT RESISTANCE |  | A | A | A |
| HYDROLYSIS RESISTANCE |  | A | A | A |
| INTERLAYER-SEPARATION RESISTANCE |  | A | A | A |

*9 - 2ND CC: second conductive composition including PBN-polyether block-copolymer

TABLE 6

|  |  | INVENTION TUBE 22 | INVENTION TUBE 23 |
|---|---|---|---|
| INNER LAYER | INSIDE LAYER - MATERIAL | 3RD CC*10 | 2ND CC |
|  | INSIDE LAYER - THICKNESS | 0.1 mm | |
|  | OUTSIDE LAYER - MATERIAL | PBN | PBN-POLYESTER BLOCK COPOLYMER |
|  | OUTSIDE LAYER - THICKNESS | 0.2 mm | 0.4 mm |
| INTERMEDIATE LAYER | MATERIAL | TPU | TPE(ESA) |
|  | THICKNESS | 0.1 mm | |
| OUTER LAYER | MATERIAL | NYLON 12 | |
|  | THICKNESS | 0.6 mm | 0.4 mm |
| FUEL-PERMEATION RESISTANCE | FC PERMEATION AMOUNT | 81 mg/m/day | 100 |
|  | M15 PERMEATION AMOUNT | 105 mg/m/day | 174 |
| DETERGENT RESISTANCE |  | A | A |
| HYDROLYSIS RESISTANCE |  | A | A |
| INTERLAYER-SEPARATION RESISTANCE |  | A | A |

*10 - 3RD CC: third conductive composition including PBN-polyester block-copolymer

TABLE 7

|  |  | COMPARATIVE TUBE 1 | COMPARATIVE TUBE 2 | COMPARATIVE TUBE 3 | COMPARATIVE TUBE 4 |
|---|---|---|---|---|---|
| INNER LAYER | MATERIAL | PBT | PEN | HDPE | NYLON 12 |
|  | THICKNESS | 0.3 mm |  | 0.2 mm |  |
| ADHESIVE LAYER | MATERIAL | — |  | MAMPE | TPU |
|  | THICKNESS | — |  | 0.1 mm |  |
| INTERMEDIATE LAYER | MATERIAL | TPU |  | PBT |  |
|  | THICKNESS | 0.1 mm |  | 0.3 mm |  |
| ADHESIVE LAYER | MATERIAL | — |  | MAMPE | TPU |
|  | THICKNESS | — |  | 0.1 mm |  |
| OUTER LAYER | MATERIAL | NYLON 12 |  | HDPE | NYLON 12 |
|  | THICKNESS | 0.6 mm |  | 0.3 mm |  |
| FUEL-PERMEATION RESISTANCE | FC PERMEATION AMOUNT | 322 mg/m/day | CRACKS | 376 | 336 |
|  | M15 PERMEATION AMOUNT | 3560 mg/m/day | — | 361 | 4128 |
| DETERGENT RESISTANCE |  | C | — | A | A |
| HYDROLYSIS RESISTANCE |  | C | — | B | B |
| INTERLAYER-SEPARATION RESISTANCE |  | A | — | C | C |

As is apparent from the results shown in TABLE 1 to TABLE 7, all the invention tubes each including the inner layer (2) formed of the PBN exhibit excellent fuel-permeation resistance, detergent resistance, hydrolysis resistance, and interlayer-separation resistance. On the other hand, comparative tubes 1, 2 whose inner layer is formed of polybutylene terephthalate ("PBT") or polyethylene naphthalate ("PEN") each as a polyester resin, exhibit insufficiently low fuel-permeation resistance, detergent resistance, and hydrolysis resistance. Likewise, comparative multi-layer tubes 3, 4 whose intermediate layer is formed of PBT and which have two adhesive layers, one between the intermediate layer and the inner layer and the other between the intermediate layer and the outer layer, exhibit insufficiently low fuel-permeation resistance, detergent resistance, and hydrolysis resistance.

As is apparent from the foregoing description, the fuel transporting tubes according to the present invention enjoy an excellent resistance to permeation of fuels, e.g., not only gasoline but also alcohol-blended gasoline, an excellent detergent resistance, and an excellent hydrolysis-deterioration resistance, and exhibit an excellent resistance to interlayer separation when being used in a high-temperature atmosphere, and are particularly suitable for use in a fuel-transporting piping system of an automotive vehicle. Thus, the invention tubes are sufficiently promising for future practical use.

What is claimed is:

1. A fuel transporting tube comprising:
   an inner layer which contacts a fuel being transported and which is formed of a polybutylene naphthalate resin, the polybutylene naphthalate resin comprising a block-copolymer which consists of a polybutylene naphthalate as a hard segment thereof and a polyether or a polyester as a soft segment thereof;
   an outer layer which is provided radially outwardly of the inner layer and which is formed of a polyamide resin or a polyolefin resin; and
   an intermediate layer which is provided between the inner layer and the outer layer and which is formed of a resin to adhere the inner and outer layers to each other.

2. The tube according to claim 1, wherein the polybutylene naphthalate comprises a condensation polymerization product of a naphthalenedicarboxylic acid or its derivative capable of producing an ester, and tetramethylene glycol.

3. The tube according to claim 2, wherein the naphthalenedicarboxylic acid is selected from the group consisting of 1,4-naphthalenedicarboxylic acid,
   1,5-naphthalenedicarboxylic acid,
   2,6-naphthalenedicarboxylic acid, and
   2,7-naphthalenedicarboxylic acid.

4. The tube according to claim 1, wherein the polyether consists of a naphthalenedicarboxylic acid or terephthalic acid and $HO(CH_2CH_2O)_nH$ or $HO(CH_2CH_2CH_2CH_2O)_nH$ (n is an integer).

5. The tube according to claim 1, wherein the block-copolymer includes 40% or less of the soft segment and 60% or more of the hard segment.

6. The tube according to claim 1, wherein the inner layer comprises a conductive layer which is formed of a composition comprising the polybutylene naphthalate resin and an electrically conductive material.

7. The tube according to claim 6, wherein the composition comprises 3 to 30 parts by weight of the electrically conductive material per 100 parts by weight of the polybutylene naphthalate resin.

8. The tube according to claim 1, wherein the polyamide resin is selected from the group consisting of nylon 6, nylon 66, nylon 11, nylon 12, nylon 610, and nylon 612.

9. The tube according to claim 1, wherein the polyolefin resin is selected from the group consisting of a homopolymer and a copolymer of an olefin monomer selected from the group consisting of ethylene, propylene, butene, hexene, and octene, and a thermoplastic elastomer including, as a main component thereof, the homopolymer or the copolymer.

10. The tube according to claim 1, wherein an outer diameter of the tube falls within a range of 8 to 50 mm, and a sum of respective thicknesses of the inner layer, the intermediate layer and the outer layer falls within a range of 0.8 to 2.0 mm.

11. The tube according to claim 1, wherein a thickness of the inner layer falls within a range of 0.04 to 1.0 mm, a thickness of the intermediate layer falls within a range of 0.02 to 0.5 mm, and a thickness of the outer layer falls within a range of 0.4 to 1.40 mm.

12. The tube according to claim 1, wherein the intermediate layer is formed of at least one resin selected from the group consisting of a thermoplastic polyether urethane, a thermoplastic polyester urethane, a thermoplastic polyether amide elastomer, a thermoplastic polyester amide elastomer, a thermoplastic polyester elastomer, a mixture of a thermoplastic polyester elastomer and a polyamide, a mixture of a polyester and a polyamide, a maleic anhydride-modified polyolefin, an acrylic acid-modified polyolefin, an epoxy-modified polyolefin, a maleic anhydride-olefin copolymer, and an alkylacrylate-olefin copolymer.

13. A fuel transporting tube comprising:
   an inner layer which contacts a fuel being transported and which is formed of a polybutylene naphthalate resin, the polybutylene naphthalate resin comprising a block-copolymer which consists of a polybutylene naphthalate as a hard segment thereof and a polyether or a polyester as a soft segment thereof;

an outer layer which is provided radially outwardly of the inner layer and which is formed of a polyamide resin or a polyolefin resin; and an intermediate layer which is provided between the inner layer and the outer layer and which is formed of a resin to adhere the inner and outer layers to each other, said inner layer comprising:

a conductive inside layer which contacts the fuel and which is formed of a composition comprising the polybutylene naphthalate resin and an electrically conductive material; and a non-conductive outside layer which is provided radially outwardly of the inside layer and which is formed of the polybutylene naphthalate resin and does not include any electrically conductive materials.

14. The tube according to claim 13, wherein a thickness of the inside layer of the inner layer falls within a range of 5 to 50% of a sum of respective thicknesses of the inside layer and the outside layer of the inner layer.

15. A fuel transporting tube comprising:

an inner layer which contacts a fuel being transported and which is formed of a polybutylene naphthalate resin, the polybutylene naphthalate resin comprising a block-copolymer which consists of a polybutylene naphthalate as a hard segment thereof and a polyether or a polyester as a soft segment thereof, an outer layer which is provided radially outwardly of the inner layer and which is formed of a polyamide resin or a polyolefin resin; and an intermediate layer which is provided between the inner layer and the outer layer and which is formed of a resin to adhere the inner and outer layers to each other, at least a portion of the tube having a corrugated shape which includes at least one annular ridge and at least one annular groove which are alternate with each other and each of which extends parallel to a plane perpendicular to a lengthwise direction of the tube.

16. A fuel transporting tube comprising:

an inner layer which contacts a fuel being transported and which is formed of a polybutylene naphthalate resin, the polybutylene naphthalate resin comprising a block-copolymer which consists of a polybutylene naphthalate as a hard segment thereof and a polyether or a polyester as a soft segment thereof, said polyester being selected from the group consisting of polycaprolactone, polyenantholactone, and polycaprylolactone;

an outer layer which is provided radially outwardly of the inner layer and which is formed of a polyamide resin or a polyolefin resin; and an intermediate layer which is provided between the inner layer and the outer layer and which is formed of a resin to adhere the inner and outer layers to each other.

17. A fuel transporting tube comprising:

an inner layer which contacts a fuel being transported and which is formed of a polybutylene naphthalate resin, the inner layer comprising:

a conductive inside layer which contacts the fuel and which is formed of a composition comprising the polybutylene naphthalate resin and an electrically conductive material, and a non-conductive outside layer which is provided directly on the conductive inside layer and which is formed of the polybutylene naphthalate resin and does not include any electrically conductive materials;

an outer layer which is provided radially outwardly of the inner layer and which is formed of a polyamide resin or a polyolefin resin; and an intermediate layer which is provided between the inner layer and the outer layer and which is formed of a resin to adhere the inner and outer layers to each other.

* * * * *